(12) United States Patent
Bahadur et al.

(10) Patent No.: US 11,187,560 B2
(45) Date of Patent: Nov. 30, 2021

(54) PROBE-BASED CIRCUMFERENTIAL TRAVERSING SYSTEM

(71) Applicant: General Electric Company, Schenectady, NY (US)

(72) Inventors: Bala Muralidhar Singh Bahadur, Bangalore (IN); Joshy John, Bangalore (IN); Srinivas Rao Pakkala, Chintalapudi (IN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 112 days.

(21) Appl. No.: 16/592,336

(22) Filed: Oct. 3, 2019

(65) Prior Publication Data

US 2021/0102824 A1 Apr. 8, 2021

(51) Int. Cl.
| *G01D 11/02* | (2006.01) |
| *G01N 29/26* | (2006.01) |
| *G01F 1/10* | (2006.01) |
| *G01K 13/02* | (2021.01) |

(52) U.S. Cl.
CPC .............. *G01D 11/02* (2013.01); *G01F 1/10* (2013.01); *G01N 29/26* (2013.01); *F05D 2270/80* (2013.01); *G01K 13/02* (2013.01)

(58) Field of Classification Search
CPC ...... G01N 29/26; G01N 29/275; G01D 11/02; G01K 13/02
See application file for complete search history.

(56) References Cited

U.S. PATENT DOCUMENTS

| 3,273,399 | A | 9/1966 | Saltzman et al. |
| 3,731,547 | A | 5/1973 | Fullbrook |
| 3,977,249 | A | 8/1976 | Wittig |
| 4,236,415 | A | 12/1980 | Musial |
| 8,408,082 | B2 | 4/2013 | Dahler et al. |
| 9,618,424 | B2 | 4/2017 | DeAscanis et al. |
| 9,708,934 | B2* | 7/2017 | Moore ................... G01M 15/14 |
| 10,724,880 | B2* | 7/2020 | Ball ......................... G01F 1/588 |
| 2006/0028016 | A1* | 2/2006 | Chabidon ............... F16L 23/16 285/2 |

(Continued)

FOREIGN PATENT DOCUMENTS

| CN | 202793795 U | 3/2013 |
| KR | 20110072715 A | 6/2011 |
| WO | 0226341 A2 | 4/2002 |

OTHER PUBLICATIONS

Lee et al., KR 2011-0072715 A, Jun. 2011, KIPO Computer Translation (Year: 2011).*

(Continued)

*Primary Examiner* — Erika J Villaluna
(74) *Attorney, Agent, or Firm* — Fletcher Yoder, P.C.

(57) ABSTRACT

A traverse mechanism for measuring flow characteristics in a fluid flow path is provided. The traverse mechanism includes a rotating member configured to rotate 360 degrees about an axis in a circumferential direction. The traverse mechanism also includes a probe coupled to the rotating member. The probe extends in a radial direction relative to the axis through a portion the rotating member into the fluid flow path. Rotation of the rotating member enables the probe to map or measure one or more flow characteristic in the fluid flow path 360 degrees about the axis in the circumferential direction.

18 Claims, 8 Drawing Sheets

(56) References Cited

U.S. PATENT DOCUMENTS

2011/0113899 A1    5/2011  Dahler et al.
2016/0018292 A1    1/2016  DeAscanis et al.

OTHER PUBLICATIONS

Aerondyn Traverse Systems website: http://www.aerodyn-global.com/products-services/instrumentation/traverse; downloaded Oct. 3, 2019; 4 pages.

PCT International Search Report and Written Opinion; Application No. PCT/US2020/052115; dated Jan. 21, 2021; 12 pages.

* cited by examiner

PROBE-BASED CIRCUMFERENTIAL TRAVERSING SYSTEM

BACKGROUND

The subject matter disclosed herein relates to traversing system and, more particularly to a circumferential traversing system.

Traversing systems that include probes are utilized to measure various flow characteristics in a flow field of turbomachines (e.g., gas turbine engines, compressors, etc.) during testing (e.g., prototype testing). For example, via mapping or measurements from the traversing systems total pressure, static pressure, temperature, flow angles, velocity components, and/or other flow characteristics may be obtained. However, existing traversing systems do not provide full area mapping mechanisms. In particular, existing traversing systems are limited in a circumferential sweep (e.g., to an area covering 40 to 60 degrees in the circumferential direction). Typically, multiple probes and/or the setup of multiple mechanisms or systems are needed to measure a 360 degree area.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a traverse mechanism for measuring flow characteristics in a fluid flow path is provided. The traverse mechanism includes a rotating member configured to rotate 360 degrees about an axis in a circumferential direction. The traverse mechanism also includes a probe coupled to the rotating member. The probe extends in a radial direction relative to the axis through a portion of the rotating member into the fluid flow path. Rotation of the rotating member enables the probe to map or measure one or more flow characteristic in the fluid flow path 360 degrees about the axis in the circumferential direction.

In a second embodiment, a traverse mechanism for measuring flow characteristics in a fluid flow path of a portion of a turbomachine is provided. The traverse mechanism includes a first flange, a second flange, and an annular plate disposed between the first flange and the second flange. The traverse mechanism also includes a gear disposed about the annular plate and configured upon actuation to rotate the annular plate 360 degrees about an axis in a circumferential direction relative to the first and the second flanges. The traverse mechanism further includes a probe coupled to the annular plate. The probe extends in a radial direction relative to the axis through a portion of the annular plate into the fluid flow path. The rotation of the annular plate enables the probe to map or measure one or more flow characteristics in the fluid flow path 360 degrees about the axis in the circumferential direction.

In a third embodiment, a traverse mechanism for measuring flow characteristics in a fluid flow path is provided. The traverse mechanism includes a stationary component and a rotating component configured to rotate about an axis in a circumferential direction relative to the stationary component. The traverse mechanism also includes an antifriction bearing system disposed between the stationary component and the rotating component to facilitate rotation. The traverse mechanism also includes a sealing system disposed between the stationary component and the rotating component to keep fluid from leaking from the traverse mechanism. The traverse mechanism further includes a probe coupled to the stationary component. The rotation of the rotating component enables the probe to map or measure one or more flow characteristics in the fluid flow path 360 degrees about the axis in the circumferential direction.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include a traversing mechanism or system (e.g., circumferential traversing mechanism or system) that provides 360 degree circumferential motion of a probe. The traversing mechanism may be coupled to or along different components of a turbomachine (e.g., gas turbine engine, compressor, etc.) to measure or map the flow characteristics. The traversing mechanism includes the proper sealing (e.g., anti-friction bearings, seals, etc.) to enable a single probe coupled to the traversing mechanism to conduct area mapping or measurements of an entire 360 degree area (e.g., in a circumferential direction relative to an axial point along a longitudinal axis). In particular, flow characteristics such as total pressure, static pressure, temperature, flow angles, velocity components may be measured in a fluid flow path or fluid flow field about the entire 360 degree area. In certain embodiments, multiple probes may be coupled to the traversing mechanism.

Figure 1:
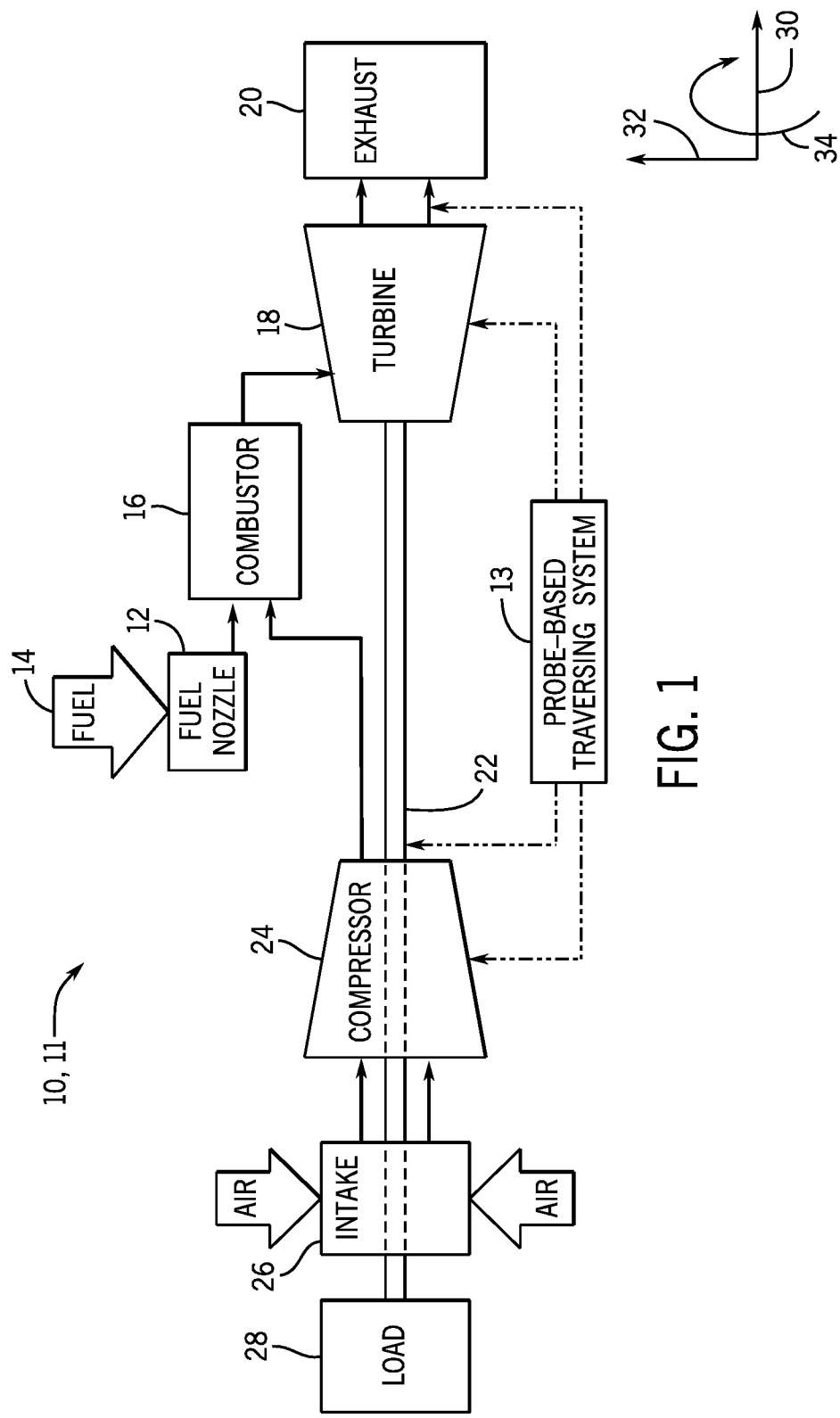
FIG. 1 is a block diagram of an embodiment of a turbomachine having a probe-based traversing system (e.g., circumferential traversing system)

Turning to the figures, FIG. 1 is a block diagram of an embodiment of a turbomachine 10 (e.g., a gas turbine engine 11). For reference, the gas turbine engine 11 may extend in axial direction 30 (e.g., relative to a longitudinal axis 36 of gas turbine engine 11, see FIG. 2), a radial direction 32 toward or away from the longitudinal axis 36, and a circumferential direction 34 around the longitudinal axis 36. The disclosed turbine system 10 employs a probe-based traversing system (e.g., circumferential traversing system) 13. As described in greater detail below, the probe-based traversing system 13 enables the mapping or measurement of one or more flow characteristics in the fluid flow path or fluid flow field 360 degrees about an axis in the circumferential direction 34. The flow characteristics may include total pressure, static pressure, temperature, flow angles, and/or velocity components. Although in the following disclosure reference is made to a gas turbine engine, the probe-based traversing system may be utilized with any turbomachine (e.g., gas turbine engine, steam turbine engine, compressor, or any other type of rotary machine).

The gas turbine engine 11 may use liquid or gas fuel, such as natural gas and/or a synthetic gas, to drive the gas turbine engine 11. As depicted, one or more fuel nozzles 12 intake a fuel supply 14, partially mix the fuel with air, and distribute the fuel and the air-fuel mixture into a combustor 16 where further mixing occurs between the fuel and air. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the gas turbine engine 11. As illustrated, the shaft 22 is connected to various components of the gas turbine engine 11, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of gas turbine engine 11.

The probe-based traversing system 13 discussed below may be coupled to various components of the gas turbine engine 11 (e.g., compressor 24, turbine 18, etc.). For example, the probe-based traversing system 13 may be coupled between stages of the compressor 24, directly downstream of the compressor 24, between stages of the turbine 18, and/or directly downstream of the turbine 18 upstream of an exhaust outlet or stack.

Figure 2:
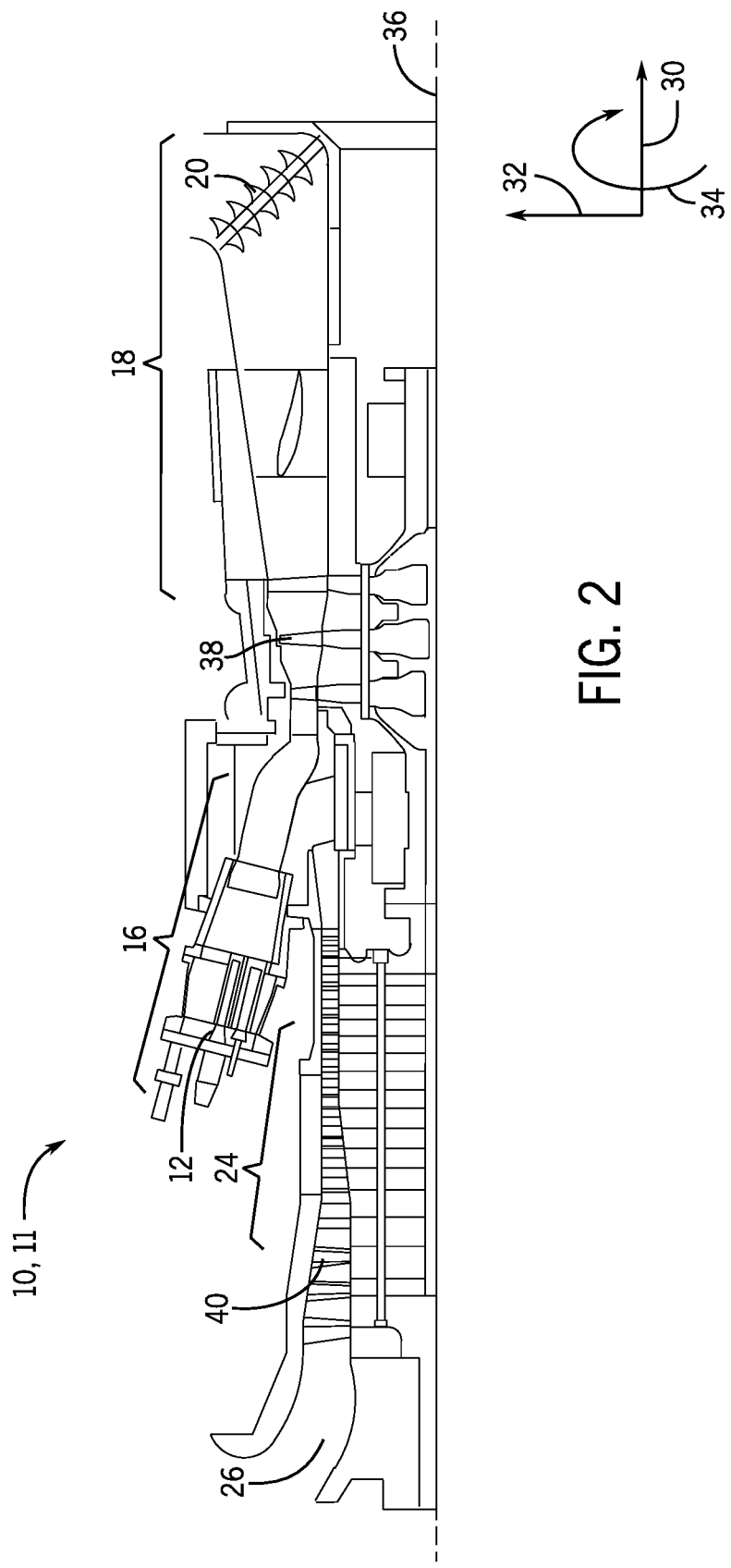
FIG. 2 is a cross-sectional side view of an embodiment of the turbomachine, as illustrated in FIG. 1.

FIG. 2 is a cross-sectional side view of an embodiment of the gas turbine engine 11 as illustrated in FIG. 1. The gas turbine engine 11 has a longitudinal axis 36. In operation, air enters the gas turbine engine 11 through the air intake 26 and is pressurized in the compressor 24. The compressed air then mixes with gas for combustion within the combustor 16. For example, the fuel nozzles 12 may inject a fuel-air mixture into the combustor 16 in a suitable ratio for optimal combustion, emissions, fuel consumption, and power output. The combustion generates hot pressurized exhaust gases, which then drive turbine blades 38 within the turbine 18 to rotate the shaft 22 and, thus, the compressor 24 and the load. The rotation of the turbine blades 38 causes a rotation of the shaft 22, thereby causing blades 40 (e.g., compressor blades) within the compressor 24 to draw in and pressurize the air received by the intake 26.

Figure 3:
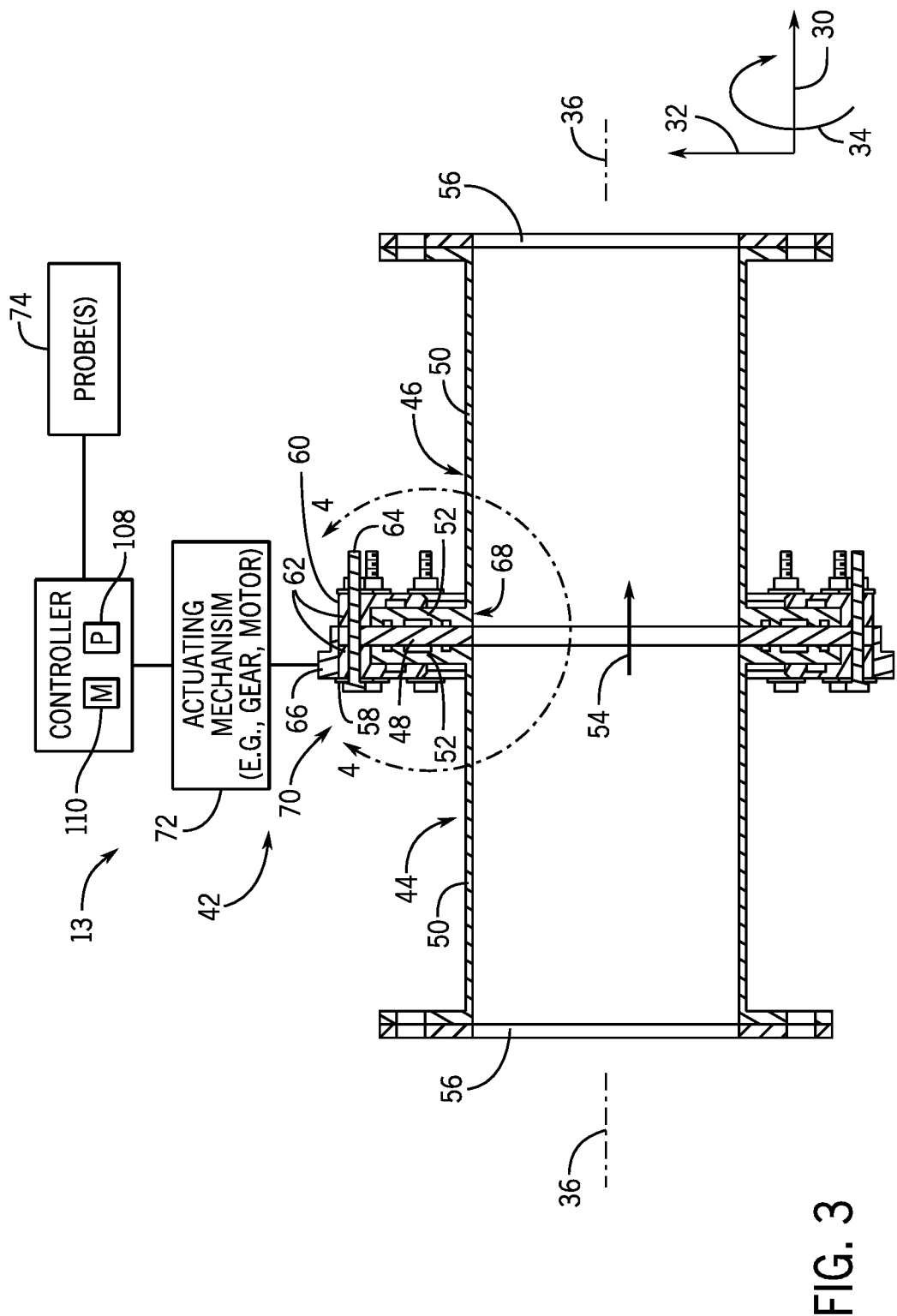
FIG. 3 is a cross-sectional side view of an embodiment of a traverse mechanism of the circumferential traversing system of FIG. 1.
Figure 4:
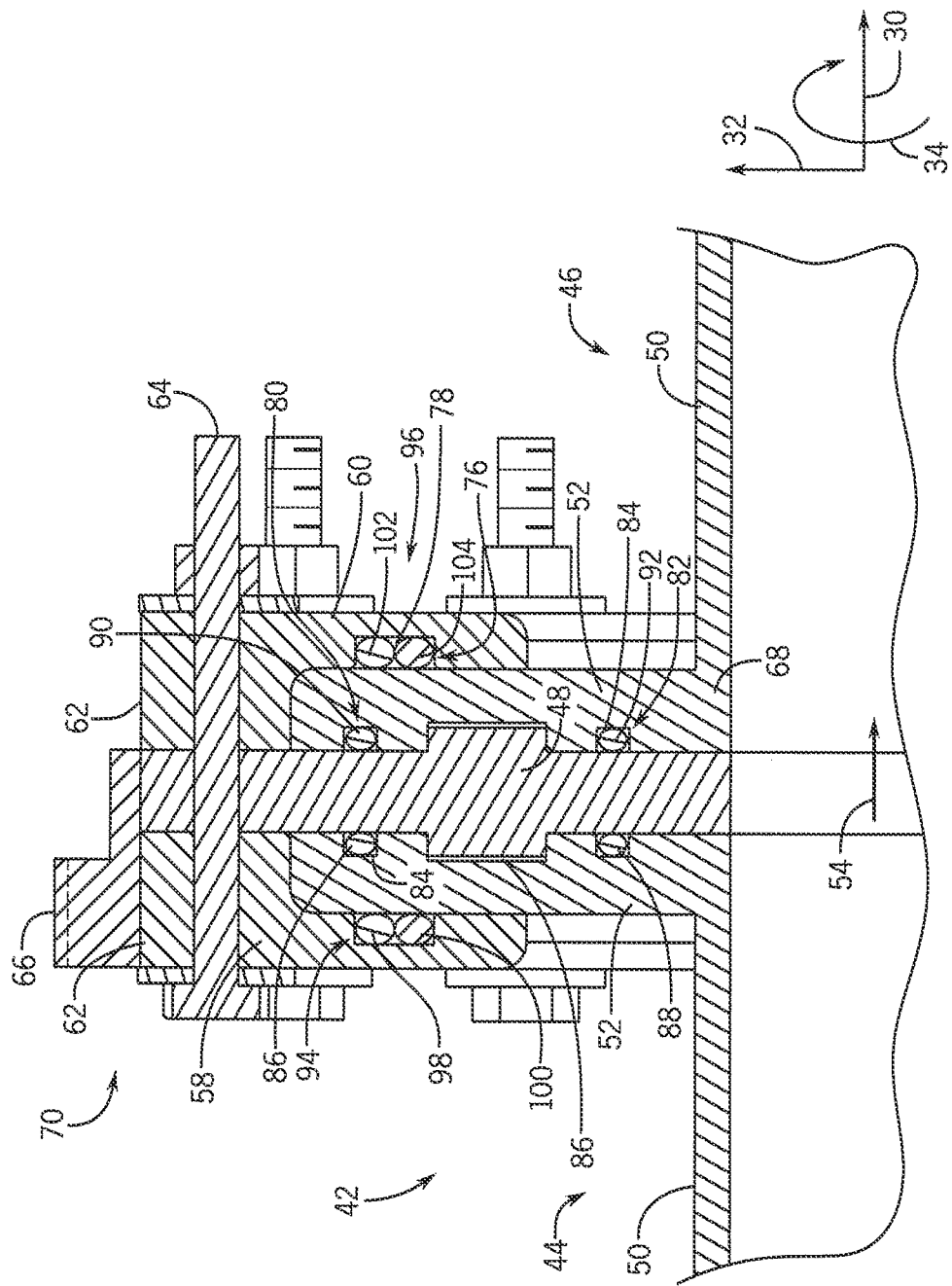
FIG. 4 is a cross-sectional side view of a portion of the traverse mechanism of FIG. 3, taken within line 4-4.

FIGS. 3 and 4 are cross-sectional side views of an embodiment of a traverse mechanism 42 (e.g., circumferential traverse mechanism) of the circumferential traversing system 13 of FIG. 1. The traverse mechanism 42 includes a first flange 44, a second flange 46, and an annular plate 48 (e.g., rotating member or center plate). The first flange 44 and the second flange 46 each include a flange portion 50 and a neck portion 52. The flange portions 50 of the flanges 44, 46 are coupled to and flank the annular plate 48. The inner surfaces of the neck portions 52 and the annular plate 48 define a fluid flow path 54 through the traverse mechanism 42 when the traverse mechanism 42 is coupled to a component of the turbomachine. Ends 56 of the flanges 44, 46 are each configured to couple to components of the turbomachine. In certain embodiments, the flanges 44, 46 may form a portion of the turbomachine. The traverse mechanism 42 also includes a first clamping plate 58 and a second clamping plate 60. The clamping plates 58, 60 are coupled to and flank the flanges portions 50 of the flanges 44, 46 to hold the flange portions 50 against or adjacent the annular plate 48 (e.g., lateral sides of the annular plate 48). Portions 62 of the clamping plates 58, 60 abut the annular plate 48 (e.g., lateral sides of the annular plate 48) and are coupled to the annular plate 48 via fasteners 64 (e.g., nuts and bolts).

The traverse mechanism 42 includes a gear 66 coupled to and configured to drive rotation of the annular plate 48 360 degrees in the circumferential direction 34 about the axis 36. As depicted, the gear 66 and the annular plate 48 are separate pieces. In certain embodiments, the gear 66 and the annular plate 48 may be an integral piece. The flanges 44, 46 form a stationary component 68 of the traverse mechanism 42. The annular plate 48, the clamping plates 58, 60, and the gear 66 form a rotating component 70 of the traverse mechanism 42. The rotating component 70 rotates in the circumferential direction 34 relative to the stationary component 68. An actuating mechanism 72 (e.g., gear, motor such as a stepper motor, etc.) interfaces with the gear 66 (e.g. teeth of the gear 66) and actuates or drives the rotation of the gear 66 and, thus, the rotating component 70.

The traverse mechanism 42 further includes one or more probes 74. The number of probes 74 may range from 1 to 5 or more. The probe(s) 74 extend radially 32 through the annular member 48 into the fluid flow path 54. The probe(s) 74 map or measure one or more flow characteristics in the fluid flow path 54. These flow characteristics may include total pressure, static pressure, temperature, flow angles, velocity components, and/or other flow characteristics. Rotation of the annular plate 48 rotates the probe(s) 74 and enables a single probe 74 (or each probe 74) to map or measure the one or more flow characteristics 360 degrees (e.g., in a 360 degree area) about the axis 36 in the circumferential direction 34.

The traverse mechanism 42 event further includes a sealing system 76 and an anti-bearing system 78. The sealing system 76 keeps fluid from leaking through the traverse mechanism 42 (e.g., specifically where the annular plate 48 and the flanges 44, 46 are coupled). The sealing system 76 includes a first sealing mechanism 80 disposed between the flange portion 52 of the first flange 44 and the annular plate 48 and a second sealing mechanism 82 disposed between the flange portion 52 of the second flange 46 and the annular plate 48. Each sealing mechanism 80, 82 includes at least one seal 84 (e.g., O-ring). The number of seals 84 in each sealing mechanism 80, 82 may range from 1 to 3 or more seals 84. As depicted, the first sealing mechanism 80 includes O-rings 86, 88 in a concentric arrangement (e.g., about a same axial point relative to axis 36) with O-ring 88 disposed radially 32 closer to the fluid flow path 54 than O-ring 86. The second sealing mechanism 82 includes the O-rings 90, 92 in a concentric arrangement (e.g., about a same axial point relative to axis 36) with O-ring 92 disposed radially 32 closer to the fluid flow path 54 than O-ring 90. The O-rings 86, 88, 90, 92 extend 360 degrees in the circumferential direction 34 about the axis 36.

The anti-bearing system 78 enables the rotating component 70 (e.g., clamping plates 58, 60) to rotate relative to the stationary component 68 (e.g., flange portions 52 of the flanges 44, 46) while reducing wear between the components 68, 70. The anti-bearing system 78 includes a first set of bearings 94 (e.g., thermoplastic polymer O-rings such as polytetrafluoroethylene (PTFE) O-rings) disposed between the first clamping plate 58 and the flange portion 52 of the first flange 44. The anti-bearing system 78 also includes a second set of bearings 96 (e.g., thermoplastic polymer O-rings such as PTFE O-rings) disposed between the second clamping plate 60 and the flange portion 52 of the second flange 50. As depicted, the number of bearings in each set may vary from 1 to 3 or more bearings. As depicted, the first set of bearings 94 includes O-rings 98, 100 in a concentric arrangement (e.g., about a same axial point relative to axis 36) with O-ring 100 disposed radially 32 closer to the fluid flow path 54 than O-ring 98. The second set of bearings 96 includes O-rings 102, 104 in a concentric arrangement (e.g., about a same axial point relative to axis 36) with O-ring 104 disposed radially 32 closer to the fluid flow path 54 than O-ring 102.

A controller 106 is communicatively coupled (e.g., data transfer, receiving and giving instructions) via a wired or wireless interface to the actuating mechanism 72 and the probe(s) 74. The controller 106 may control the rotation of the annular plate 48 and, thus, the probe(s) 74 as well as the mapping and/or measurements by the probe(s) 74. The controller 106 has a processor 108 and a memory 110 (e.g., a non-transitory computer-readable medium/memory circuitry) communicatively coupled to the processor 108, storing one or more sets of instructions (e.g., processor-executable instructions) implemented to perform operations related to the traverse system 13. More specifically, the memory 110 may include volatile memory, such as random access memory (RAM), and/or non-volatile memory, such as read-only memory (ROM), optical drives, hard disc drives, or solid-state drives. Additionally, the processor 108 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

Figure 5:
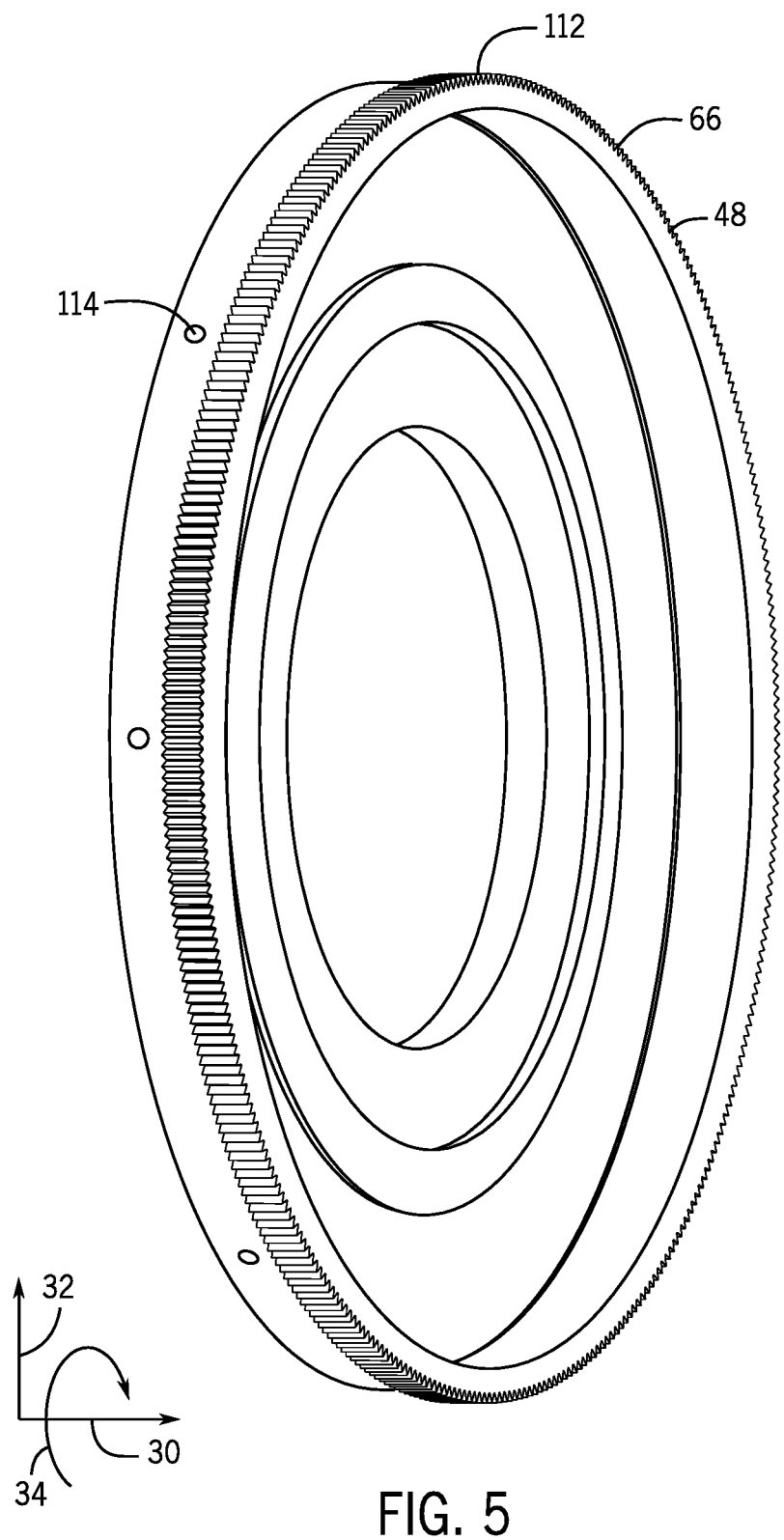
FIG. 5 is a perspective view of an embodiment of a gear disposed about an annular plate of a traverse mechanism.

FIG. 5 is a perspective view of an embodiment of the gear 66 disposed about the annular plate 48 of the traverse mechanism. As depicted, the gear 66 is disposed 360 degrees circumferentially 34 about an outer edge of the annular plate 48. The gear 66 includes teeth 112 for engaging with an actuation mechanism (e.g., motor, gear, etc.) that drives rotation of the gear 66 and, thus, the annular plate 48. The gear 66 also includes one or more ports 114 (aligned with respective ports on the annular plate 48) for receiving a probe within a fluid flow path. The ports 114 are spaced apart circumferentially 34 about the gear 66. In certain embodiments, a single port 114 for a single probe may be utilized. In other embodiments, multiple ports 114 for multiple respective probes may be utilized.

Figure 6:
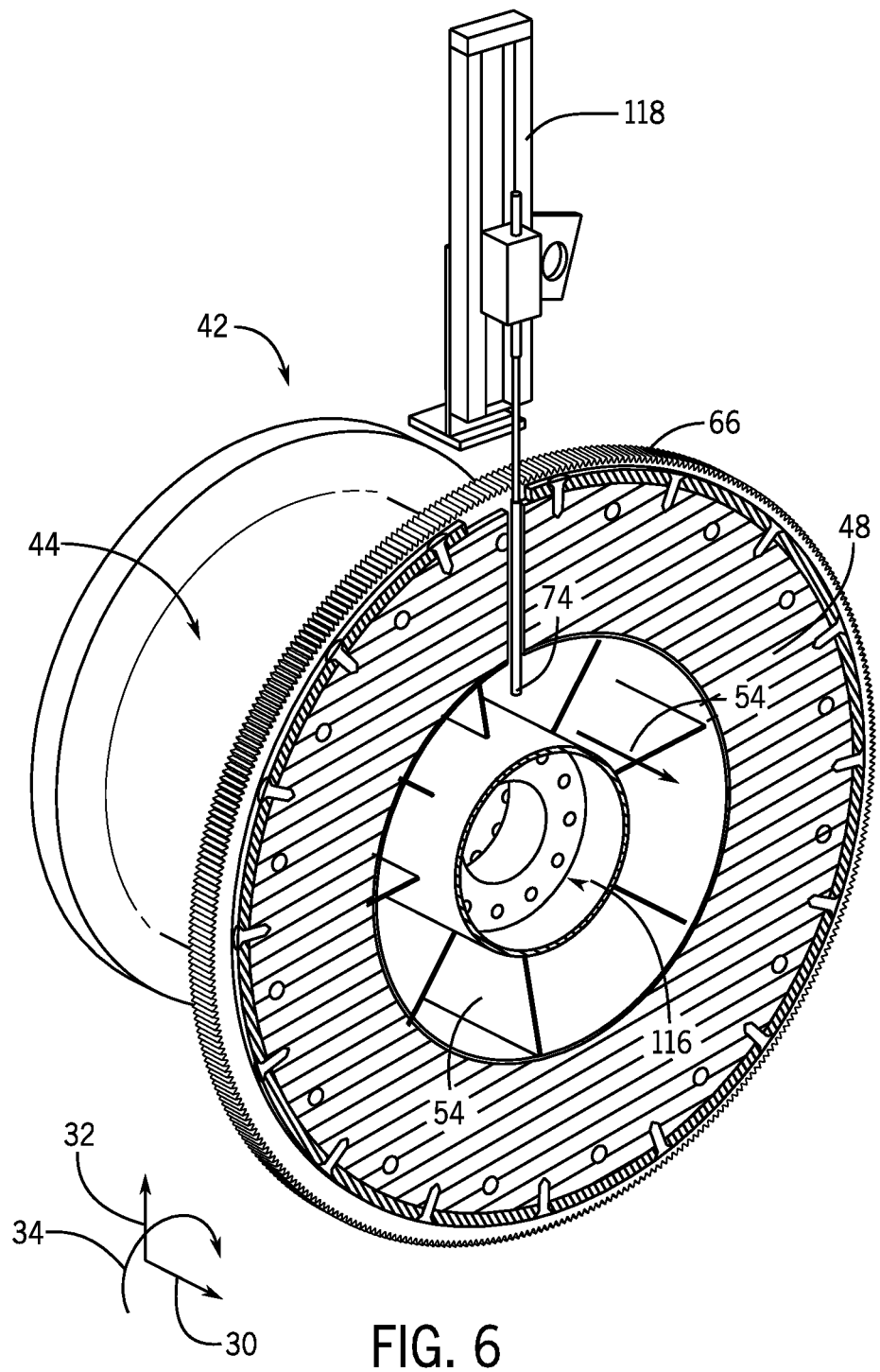
FIG. 6 is a perspective view of an embodiment of a portion of a traverse mechanism with a probe.

FIG. 6 is a perspective of an embodiment of a portion of the traverse mechanism 42 with the probe 74 (e.g., single probe 74). As depicted, the traverse mechanism is coupled to a component 116 (e.g., turbine) of a turbomachine. The probe 74 is disposed through the annular plate 48 into the fluid flow path 54. As depicted, the flange 44 forms a portion (e.g., casing) of the component 116 of the turbomachine. An actuating mechanism 118 is coupled to the probe 74 to insert the probe 74 into the annular plate 48 and the fluid flow path 54 and to remove the probe from the annular plate 48 and the fluid flow path 54 in the radial direction 32. During rotation of the annular plate 48, the actuating mechanism is not coupled to probe 74, thus, enabling the probe 74 to rotate circumferentially 34. In certain embodiments, the actuating mechanism 118 may rotate with the probe 74.

Figure 7:
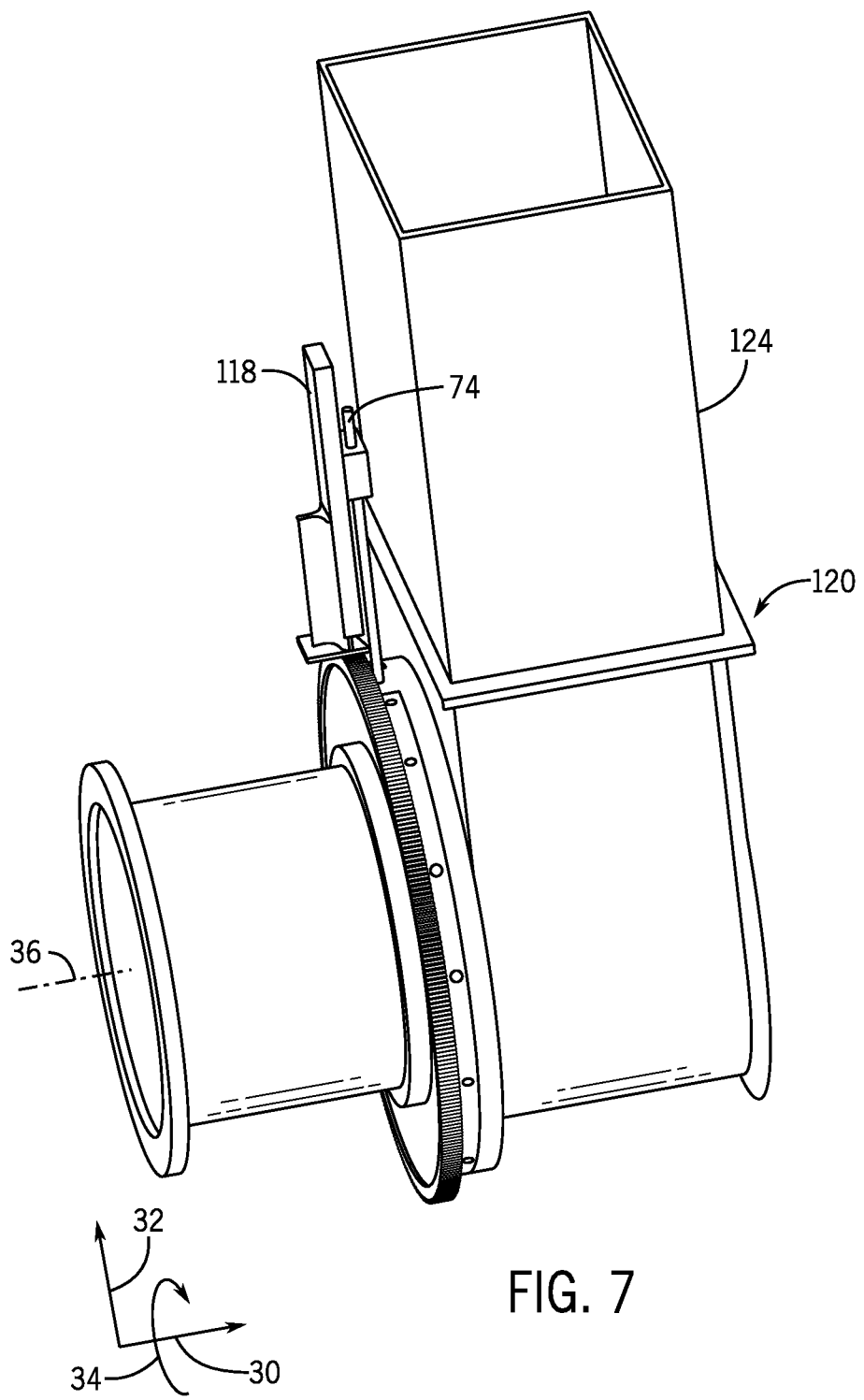
FIG. 7 is a perspective view of an embodiment of a traverse mechanism coupled to a portion of a turbomachine.
Figure 8:
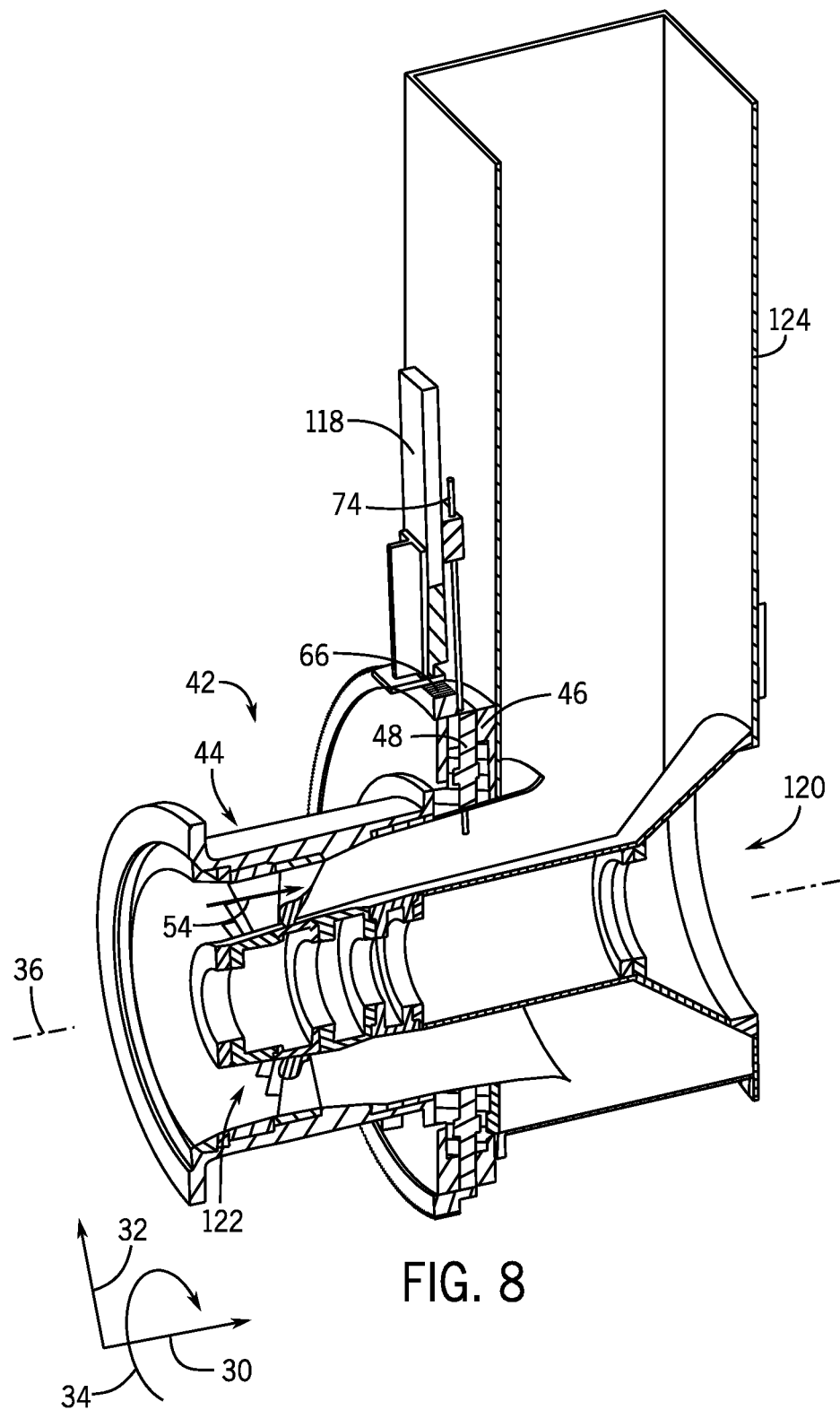
FIG. 8 is a cross-sectional view of the traverse mechanism coupled to the portion of the turbomachine in FIG. 7.

FIGS. 7 and 8 and are views of the traverse mechanism 42 coupled to a portion of a turbomachine 120. As depicted, the turbomachine 120 includes a turbine 122 and an exhaust stack 124. As depicted, the flanges 44, 46 and the annular plate 48 define a portion of the fluid flow path 54. In addition, the flanges 44, 46 form a portion of the turbomachine 120.

Technical effects of the disclosed embodiments include providing a traverse mechanism that enables one or more probes to circumferentially traverse a fluid flow path (e.g. of a component of a turbomachine). This enables the mapping or measurements of one or more fluid flow characteristics about a 360 degree area within the fluid flow path utilizing a single setup.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112 (f).

The invention claimed is:

1. A traverse mechanism for measuring flow characteristics in a fluid flow path of a portion of a turbomachine, comprising:
   a rotating member configured to rotate 360 degrees about an axis in a circumferential direction, wherein the axis is a longitudinal axis of the turbomachine;
   a first flange and a second flange coupled to and flanking the rotating member to define the fluid flow path;
   a first clamping plate and a second clamping plate coupled to and flanking the first and second flanges and the rotating member, wherein the first and second clamping plates are configured to hold the first and second flanges adjacent the rotating member; and
   a probe coupled to the rotating member, wherein the probe extends in a radial direction relative to the axis through a portion of the rotating member into the fluid flow path, and wherein the probe is configured to rotate with the rotating member 360 degrees about the axis;
   wherein rotation of the rotating member and the probe enables the probe to map or measure one or more flow characteristics in the fluid flow path 360 degrees about the axis in the circumferential direction.

2. The traverse mechanism of claim 1, comprising a first sealing mechanism disposed between the first flange and the rotating member and a second sealing mechanism between the second flange and the rotating member to keep fluid from leaking from the traverse mechanism.

3. The traverse mechanism of claim 2, wherein both the first sealing mechanism and the second mechanism each comprise at least one O-ring.

4. The traverse mechanism of claim 1, comprising at least one anti-friction bearing disposed between the first clamping plate and the first flange and at least one anti-friction bearing disposed between the second clamping plate and the second flange, wherein the anti-friction bearings are configured to facilitate rotation of the first clamping plate, the rotating member, and the second clamping plate relative to first and second flanges.

5. The traverse mechanism of claim 4, wherein the anti-friction bearings comprise polytetrafluoroethylene O-rings.

6. The traverse mechanism of claim 1, comprising a gear circumferentially disposed about the rotating member, wherein actuation of the gear is configured to rotate the rotating member and the probe.

7. The traverse mechanism of claim 6, comprising an actuation mechanism to actuate rotation of the gear.

8. The traverse mechanism of claim 1, wherein the traverse mechanism is configured to couple to a portion of a turbomachine.

9. A traverse mechanism for measuring flow characteristics in a fluid flow path of a portion of a turbomachine, comprising:
   a first flange;
   a second flange;
   an annular plate disposed between the first flange and the second flange;
   a gear disposed about the annular plate and configured upon actuation to rotate the annular plate 360 degrees about an axis in a circumferential direction relative to the first and the second flanges, wherein the axis is a longitudinal axis of the turbomachine; and
   a probe coupled to the annular plate, wherein the probe extends in a radial direction relative to the axis through a portion of the annular plate into the fluid flow path, and wherein the probe is configured to rotate with the annular plate 360 degrees about the axis;
   wherein rotation of the annular plate and the probe enables the probe to map or measure one or more flow characteristics in the fluid flow path 360 degrees about the axis in the circumferential direction.

10. The traverse mechanism of claim 9, wherein the first flange comprises a first flange portion and a first neck portion and the second flange comprises a second flange portion and a second neck portion, and wherein the first and second flange portions coupled to the annular plate and the first and second flange portions are configured to couple to the portion of the turbomachine.

11. The traverse mechanism of claim 9, comprising a sealing system disposed between first and the second flanges and the annular plate to keep fluid from leaking from the traverse mechanism.

12. The traverse mechanism of claim 11, wherein the sealing system comprises a first set of O-rings disposed between the first flange and the annular plate and a second set of O-rings disposed between the second flange and the annular plate.

13. The traverse mechanism of claim 12, wherein the first set of O-rings comprises a first O-ring and second O-ring in a concentric arrangement relative to the axis, and the second set of O-rings comprises a third O-ring and a fourth O-ring in a concentric arrangement relative to the axis.

14. The traverse mechanism of claim 9, comprising an anti-friction bearing system configured to facilitate rotation of the rotating member relative to first and second flanges.

15. The traverse mechanism of claim 14, comprising a first clamping plate and a second clamping plate coupled to and flanking the first and second flanges.

16. The traverse mechanism of claim 15, wherein the anti-friction bearing system comprises a first set of thermoplastic polymer O-rings disposed between the first clamping plate and the first flange and a second set of thermoplastic polymer O-rings disposed between the second clamping plate and the second flange.

17. The traverse mechanism of claim 16, wherein the first set of thermoplastic O-rings comprises a first thermoplastic O-ring and a second thermoplastic O-ring in a concentric arrangement relative to the axis, and the first set of thermoplastic O-rings comprises a third thermoplastic O-ring and a fourth thermoplastic O-ring in a concentric arrangement relative to the axis.

18. A traverse mechanism for measuring flow characteristics in a fluid flow path of a portion of a turbomachine, comprising:
   a stationary component;
   a rotating component configured to rotate 360 degrees about an axis in a circumferential direction relative to the stationary component, wherein the axis is a longitudinal axis of the turbomachine;
   a first flange and a second flange coupled to and flanking the rotating component to define the fluid flow path;
   a first clamping plate and a second clamping plate coupled to and flanking the first and second flanges and the rotating component, wherein the first and second clamping plates are configured to hold the first and second flanges adjacent the rotating component;
   an anti-friction bearing system disposed between the stationary component and the rotating component to facilitate rotation;
   a sealing system disposed between the stationary component and the rotating component to keep fluid from leaking from the traverse mechanism; and a probe coupled to the rotating component, wherein the probe is configured to rotate with the rotating component 360 degrees about the axis, and wherein rotation of the rotating component and the probe enables the probe to map or measure one or more flow characteristics in the fluid flow path 360 degrees about the axis in the circumferential direction.

* * * * *